US006315153B1

(12) United States Patent
Osborn

(10) Patent No.: US 6,315,153 B1
(45) Date of Patent: Nov. 13, 2001

(54) ADAPTER FOR CUP HOLDERS

(76) Inventor: Donald E. Osborn, 6245 Tiffany Ave. NE., Rockford, MI (US) 49341

( * ) Notice: Subject to any disclaimer, the term of this patent is extended or adjusted under 35 U.S.C. 154(b) by 0 days.

(21) Appl. No.: 09/470,792

(22) Filed: Dec. 23, 1999

(51) Int. Cl.⁷ .................................................. B65D 25/00
(52) U.S. Cl. .................... 220/737; 248/311.2; 224/926
(58) Field of Search .................. 220/737, 4.03, 220/4.26, 4.27, 8, 23.86, 23.91, 23.87, 23.83, 630, 656, 657, 658, 659, 676; 224/926, 483, 564; 248/311.2, 346.11, 146, 149, 314; D7/306, 310, 619, 622, 624; 296/37.8, 37.12, 37.13

(56) References Cited

U.S. PATENT DOCUMENTS

| | | | |
|---|---|---|---|
| 5,052,649 | * 10/1991 | Hunnicutt | 248/311.2 |
| 5,112,017 | * 5/1992 | Pang | 248/311.2 |
| 5,174,534 | * 12/1992 | Mitchell | 248/311.2 |
| 5,238,161 | * 8/1993 | Kimishima | 244/217 |
| 5,326,064 | * 7/1994 | Sapien | 248/311.2 |
| 5,330,145 | * 7/1994 | Evans et al. | 248/311.2 |
| 5,651,523 | * 7/1997 | Bridges | 248/311.2 |
| 5,669,538 | * 9/1997 | Ward | 224/539 |
| 5,676,340 | * 10/1997 | Ruhnau | 248/311.2 |
| 5,743,504 | * 4/1998 | Miller | 248/311.2 |
| 5,897,041 | * 4/1999 | Ney et al. | 224/926 X |
| 6,099,062 | * 8/2000 | Siegel | 296/37.12 |

* cited by examiner

Primary Examiner—Allan N. Shoap
Assistant Examiner—Nen Ngo
(74) Attorney, Agent, or Firm—Van Dyke, Gardner, Linn & Burkhart, LLP

(57) ABSTRACT

An adapter for adapting a conventional cup holder to hold a wide arrange of containers. Furthermore, the adapter provides for a removable insert which can be used to further adapt the adapter to accommodate various container sizes and, in addition, optionally to provide insulation to the container to maintain the temperature of the drink in the container generally constant. The adapter includes an adapter body having a transverse passage for receiving a container which has a larger width than the cavity width of the cup holder. The body includes an upper body portion and a lower body portion, with the lower body portion having a smaller width than the upper body portion and for inserting into the cylindrical cavity of the cup holder. The body further includes a transition portion between the upper portion and the lower body portion which defines a rest for the container thereby adapting the cylindrical cavity of the cup holder to hold the container. The insert includes an upper portion and a lower portion. The lower portion extends into the lower body portion of the adapter with the upper portion resting on the rest of the adapter body and for supporting the container in the upper body portion on the rest. The insert may comprise a paper insert, a foam insert, or the like, to form an insulation layer around the container.

20 Claims, 3 Drawing Sheets

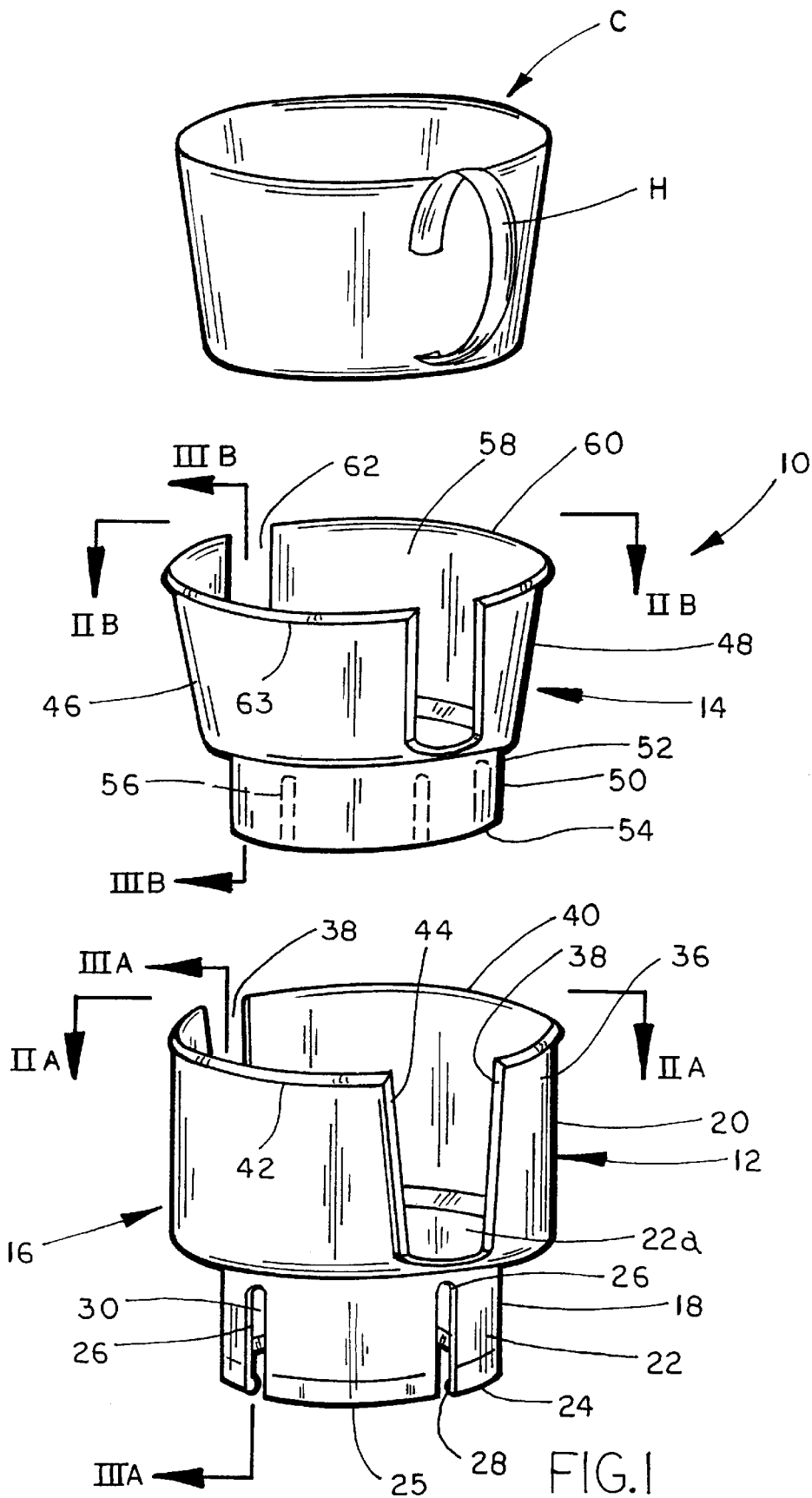

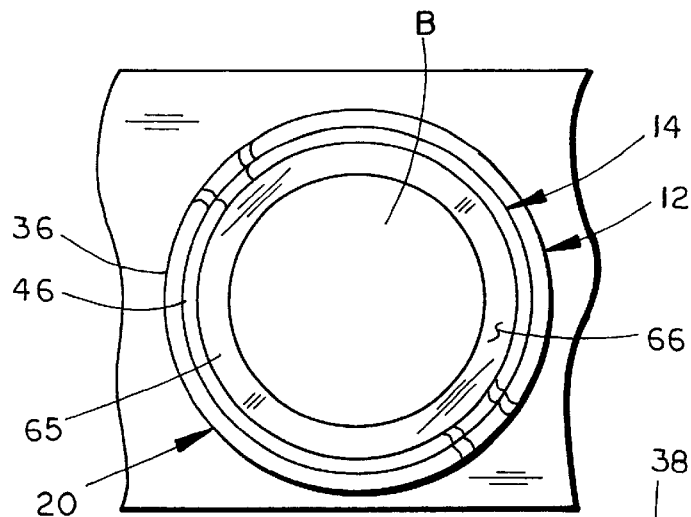
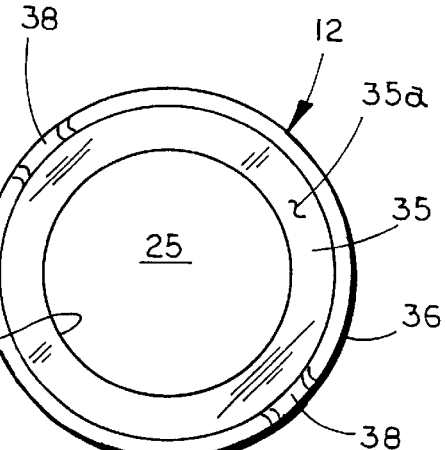
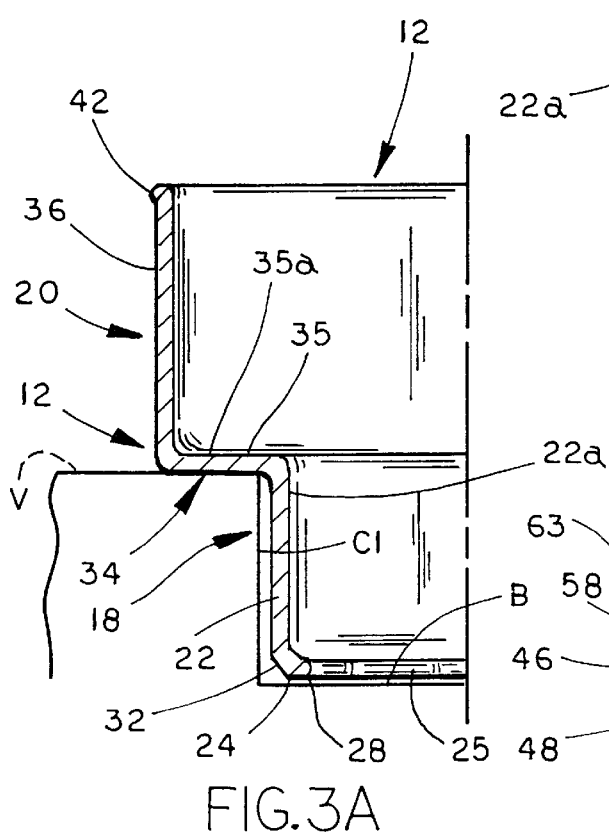
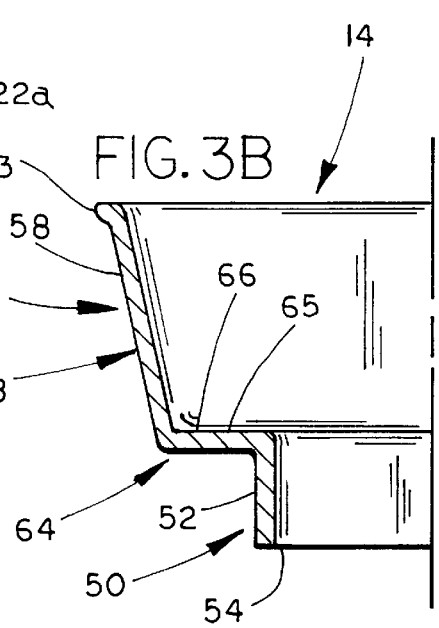

ADAPTER FOR CUP HOLDERS

TECHNICAL FIELD AND BACKGROUND OF THE INVENTION

The present invention relates to an adapter for adapting a conventional cup holder, for example a cup holder in vehicles, including cars, boats, vans, trucks, or the like, so that the cup holder can hold a container with a larger or smaller diameter than the diameter of the cup holder cavity.

Conventional cup holders include a recessed cavity which has a fixed inside diameter so that the cup holder is suitable for only a small range of container or cup sizes, thus limiting the use of the cup holder. More recently, cup holders have incorporated a tiered cavity, which forms a first smaller cavity for holding smaller containers, such as soda cans or bottles, and an upper cavity which accommodates larger containers, for examples mugs or the like. However, most of these cup holders do not accommodate the larger containers, for example, super-sized containers that are available in fast food restaurants or convenient stores, such as 7-ELEVEN™ stores, gas stations, and the like. When traveling long distance in a vehicle, most people like the convenience of purchasing the larger volume drinks in order to extend the period between stops and, further, to economize. Often these super-sized drinks cost only a fraction more than the smaller size drinks. Furthermore, conventional cup holders provide no means to maintain the temperature of a drink placed in the cup holder. When purchasing these super-size drinks, the lack of insulation in the cup holder is even more noticeable. Super-size drinks take longer to consume and often cool or warm up well before the drink is consumed.

Consequently, there is a need for an adapter which will enable conventional cup holders to hold larger containers and, furthermore, which may provide means to generally maintain the temperature of the drink in the container.

SUMMARY OF THE INVENTION

The present invention provides for an adapter which may be inserted in the conventional cup holder to adapt the cup holder to hold a wider range of container sizes. Furthermore, the adapter of the present invention provides for a removable insert which can be used to further adapt the adapter to accommodate various container sizes and, in addition, which may provide insulation to the container to maintain the temperature of the drink in the container and, further, provide an insulated holder for the container which is especially suitable for holding a hot drink.

In one form of the invention, a cup holder adapter for a cup holder includes an adapter body having a transverse passage for receiving a container, which has a larger width than the cavity width of the cup holder. The body includes an upper body portion and a lower body portion, with the lower body portion having a smaller width than the upper body portion and for inserting into the cylindrical cavity of the cup holder. The body further includes a transition portion between the upper body portion and the lower body portion, which defines a rest for the container and, thereby, adapts the cylindrical cavity to hold the container. In one aspect, the rest comprises an annular support surface.

In other aspects, the upper body portion includes at least one elongate slot for receiving a handle of a container. For example, the elongate slot may extend to the transition portion. In addition, the slot introduces flexibility into the upper body portion to further increase the range of container sizes or shapes that can be held in the upper body portion.

In further aspects, the cup holder adapter includes an insert. The insert includes an upper portion and a lower portion. The lower portion extends into the lower body portion of the adapter, with the upper portion resting on the rest of the adapter body and for supporting the container in the upper body portion on the rest. The insert preferably comprises a cylindrical body having an upper cylindrical body portion defining the upper portion and a lower cylindrical body portion defining the lower portion. The cylindrical body further includes a transition portion between the upper cylindrical body portion and the lower cylindrical body portion. The transition portion of the insert defines a seat for the container, with the seat for supporting the container on the rest of the first body whereby the insert and the adapter body adapt the cylindrical cavity of the cup holder to hold the container. Preferably, the transition portion of the insert comprises an annular support surface.

In another form of the invention, a cup holder adapter for a cup holder includes a cylindrical body having a transverse passage for receiving a container having a larger width than the cavity width of the cup holder. The cylindrical body includes an upper cylindrical body portion and a lower cylindrical body portion. The lower cylindrical body portion has a smaller diameter than the upper cylindrical body portion and inserts into the cylindrical cavity of the cup holder. Further, the lower body portion is adapted to frictionally engage the cup holder. The cylindrical body includes an annular support surface for supporting the container thereon, thereby adapting the cylindrical cavity of the cup holder to hold the container.

In other aspects, the lower body portion includes a cylindrical wall with a lower distal edge. The lower distal edge defines an opening in communication with said transverse passage. Optionally, the lower body portion may include at least one elongate slot extending from the lower distal edge. The elongate slot induces flexibility into the lower body portion whereby the lower body portion is compressible.

In yet another form of the invention, a cup holder adapter assembly for a cup holder includes a first body having a transverse passage defining opposed open ends with at least a portion of the first body being adapted to insert into the cavity. The assembly further includes in an insert positionable in the transverse passage, with the insert including a second body having an upper body portion and a lower body portion. The lower body portion has a smaller width than the upper body portion and is for inserting into the transverse passage of the first body. The second body includes a seat for a container having a width greater than the cavity width thereby adapting the cylindrical cavity of the cup holder to hold a container having a larger width from the width of the cavity.

In further aspects, the insert comprises a paper insert for forming an insulation layer around the container. In another aspect, the insert comprises a foam insert for forming an insulation layer around the container. In yet other aspects, the insert may include tapered sides to accommodate a range of container sizes. For example, the insert may include a frusto-conical shaped wall.

These and other objects, features, advantages, and purposes will become more apparent from the study of the drawings taken in conjunction with the description that follows.

DETAILED DESCRIPTION OF THE DRAWINGS

FIG. 1 is an exploded perspective view of an adapter assembly of the present invention illustrating an adapter and an insert with a container for positioning in the adapter and insert;

FIG. 2A is a top plan view of the adapter of FIG. 1 as viewed from line IIA—IIA of FIG. 1;

FIG. 2B is a top plan view of the insert positioned in the adapter as viewed from IIB—IIB of FIG. 1;

FIG. 3A is a cross sectional view taken along line IIIA—IIIA of FIG. 1;

FIG. 3B is a cross sectional view of the insert taken along line IIIB—IIIB of FIG. 1;

DETAILED DESCRIPTION OF THE PREFERRED EMBODIMENTS

Figure 4:
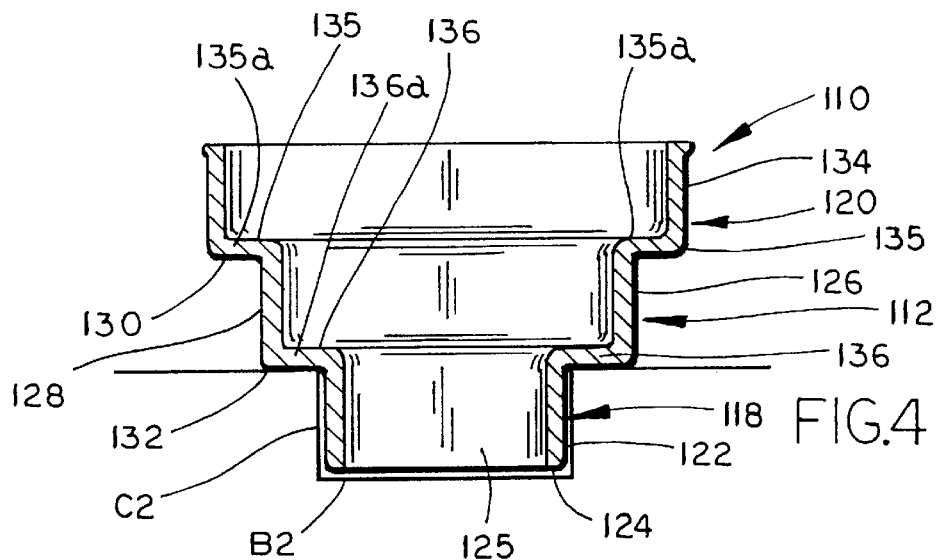
FIG. 4 is a cross-sectional view of a second embodiment of the adapter of the present invention.

Referring to FIG. 1, the numeral 10 generally designates an adapter assembly of the present invention. Adapter assembly 10 includes an adapter 12 and an insert 14. Adapter 12 is for placing in a cavity C1 (FIG. 3A) of a conventional cup holder in a console or the like, for example a cup holder in a vehicle, including cars, vans, trucks, boats or the like, to permit the cup holder to be used for holding larger or smaller containers than the cup holder was originally designed to hold. Insert 14 is for optionally placing inside adapter 12 to further accommodate different container sizes and optionally to provide an insulation layer for the container so that the temperature of the drink inside the container remains generally constant or at least does not decrease or increase rapidly as it would otherwise in the ambient environment of the vehicle. Furthermore, insert 14 may be sized to form a cover or jacket for the container so that the person holding the container is protected from hot containers, such as paper cups or mugs or the like.

Adapter 12 is preferably formed from a plastic material but may optionally be formed from a foam, fiber board, aluminum or even paper material. Adapter 12 includes a body 16 with a lower body portion 18 for inserting into cavity C1 of the cup holder and an upper body portion 20 which is sized to hold containers having widths greater than the width of cavity C1, such as super-size cups or the like. Lower body portion 18 includes a cylindrical wall 22 with a lower free edge 24, which defines an opening 25 and rests on the bottom surface B of cavity C1 of the cup holder. Optionally, lower body portion 18 may include one or more elongate slots 26 which extend upwardly from lower edge 24 so as to form a compressible lower body portion 18. In this manner, lower body portion 18 may be inserted into a variety of cup holder cavity sizes. Furthermore, when compressed into a cavity of a cup holder, lower body portion 18 frictionally engages the side walls of the respective cup holder to secure adapter 12 in the cavity of the cup holder. Depending on the material, it may be desirable to reinforce lower edge 24, for example, by a reinforcing rib 28. Preferably, rib 28 comprises an annular rib, which optionally terminates at the edge of the elongate slots 26. Optionally, rib 28 may extend along the free edges 30 of elongate slots 26 to reinforce cylindrical wall 22 around elongate slots 26 as well.

Referring to FIG. 3A, lower peripheral portion 32 of cylindrical wall 22 may be tapered inwardly which forms a cam surface to urge cylindrical wall 22 to compress when inserted into a cavity of a cup holder with a smaller diameter than the outside diameter of cylindrical wall 22. Referring again to FIG. 3A, adapter 12 includes a transition portion 34 between upper body portion 20 and lower body portion 18. In the illustrated embodiment, transition portion 34 comprises an annular wall 35 which interconnects cylindrical wall 22 of lower body portion 18 and cylindrical wall 36 of upper body portion 20. Annular wall 35 provides a rest or support for a container placed in adapter 12 or a support for insert 14, as will be more fully described below. In this manner, adapter 12 can be inserted into an open cavity of a cup holder which has a diameter approximately equal to or greater than lower cylindrical wall 22 while providing a support surface 35a radially outward from the support surface of the cup holder and, therefore, can hold larger containers than the cup holder was originally designed to hold. Furthermore, by providing a lower body portion 18 which frictionally engages the cavity of the cup holder, adapter 12 provides a stable support for containers placed in adapter 12. Furthermore, it should be understood that lower portion 18 may provide a holder for a smaller container than the cavity of the cup holder was designed to support, as would be understood by those skilled in the art.

Referring again to FIG. 1, cylindrical wall 36 of upper portion 20 includes generally parallel sides and, further, may optionally include elongate slots 38 which extend downwardly from upper free edge 40 of cylindrical wall 36 to accommodate a handle H of a container, such as a mug or cup C. Similar to cylindrical wall 22, cylindrical wall 36 may include a reinforcing rib 42 which extends along free edge 40 and either terminates at slots 38 or continues downwardly along sides 44 of elongate slots 38 to reinforce cylindrical wall 36 around elongate slots 38. Preferably, elongate slots 38 extends down cylindrical wall 36 to transition portion 34 to accommodate a wide variety of handle designs. Furthermore, slots 38 allow the sides of cylindrical wall 36 to flex and, therefore, permit upper portion 20 to accommodate a variety of different cup shapes and sizes. When a cup is placed in upper body portion 20 of adapter 12 which is slightly larger than the inner diameter of cylindrical wall 36, upper body portion 20 will flex and, therefore, frictionally engage the cup placed in upper body portion 20 to further provide a stable arrangement and provide a secure hold on the cup in the cavity of the cup holder. It should be understood that cylindrical wall 36 may be provided with the same or different size slots 38 to accommodate different size handles.

Insert 14 includes a body 46 with an upper portion 48 and a lower portion 50, which inserts into lower body portion 18 of adapter 12. Optionally, lower portion 50 may be sized to frictionally engage lower body portion 18. Lower portion 50 is formed from a cylindrical wall 52 which includes a lower free edge 54. Cylindrical wall 52 may optionally include elongate slots 56 (shown in phantom) which extend upwardly from lower free edge 54 to form a compressible lower body portion 50. In this manner, as noted above, when inserted into adapter 12, lower portion 50 may optionally fictionally engage the inner surface 22a of cylindrical wall 22 of lower body portion 18. In the illustrated embodiment, upper portion 48 comprises a frusto-conical wall 58 with an upper free edge 60 and optional elongate slots 62. Similar to adapter 12, wall 58 may include a reinforcing rib 63 which extends around edge 60 and optionally extends down each respective slots 62 similar to slots 38 and 26 of adapter 12.

As best seen in FIG. 3B, body 46 includes a transition portion 64 between upper portion 48 and lower portion 50. Transition portion 64 comprises an annular wall 65 which connects cylindrical wall 58 of upper portion 48 and cylindrical wall 52 of lower portion 50. Annular wall 65 provides an annular support surface 66 or seat radially outwardly of cavity C1 for a container that is positioned in insert 14 which in turn is positioned in adapter 12. Thus, when insert 14 is placed in adapter 12, lower portion 50 extends into lower body portion 18 of adapter and transition portion 64 rests on support surface 35a of adapter 12 with support surface 66 of insert 14 providing a support surface for a container placed in insert 14. It should be understood from the foregoing, that insert 14, therefore, adapts the adapter to further increase the range of container sizes that may be supported in the adapter assembly 10.

In preferred form, insert 14 may be formed such as by molding from plastic or may be formed from Styrofoam, fiber board, aluminum, or paper. When formed from paper, fiber board, or Styrofoam, insert 14 forms an insulation layer around the respective container to generally maintain the temperature of the drink in the container constant. In addition, insert 14 may comprise a disposable insert which may be purchased for example at the point-of-sale of the container. For example, when a store, for example a gas station, food mart, or 7-ELEVEN™ sells beverages in containers, the store may carry a variety of inserts which are suitable for each respective container for inserting into adapter 12; thus, a passenger or driver of a vehicle who is purchasing a beverage for consumption in the vehicle, and wishes to safely secure the beverage container within the vehicle, may optionally purchase a suitable insert so that adapter 12 will securely hold the respective container. Furthermore, the insert may be used to provide an insulator for the beverage to maintain the temperature of the beverage generally constant. In addition, where an insert is selected that snugly fits over the container, insert 14 may form an insulation jacket which is especially suitable for use with containers holding hot drinks. It can be appreciated that with this combination, the adapter assembly 10 of the present invention can accommodate a plurality of container sizes and shapes and, further, will securely bold the respective container in the cup holder cavity.

Referring to FIG. 4, a second embodiment 110 of the adapter assembly of the present invention is illustrated. Adapter assembly 110 includes an adapter 112 and may optionally include an insert, such as insert 14. Adapter 112 includes a lower body portion 118 and an upper body portion 120. Lower body portion 118 is sized for insertion into a cup holder cavity C2 and includes a cylindrical wall 122 with a free edge 124 which defines an opening therethrough 125 and, further, which rests on base B2 of cup holder cavity C2. Adapter 112 additionally includes a medial portion 126 which includes a cylindrical wall 128 and two transition portions 130 and 132 which connect to cylindrical wall 122 of lower body portion 118 and cylindrical wall 134 of upper body portion 120 by annular walls 135 and 136. In this manner, adapter 122 includes two rests or support surfaces 135a and 136a to accommodate different size containers, as would be understood by those skilled in the art. Thus, when an insert 14 is placed in adapter 112, insert 14 may rest on either surface 135a, 136a of annular walls 135 and 136 depending on the size of insert that is selected.

Figure 5A:
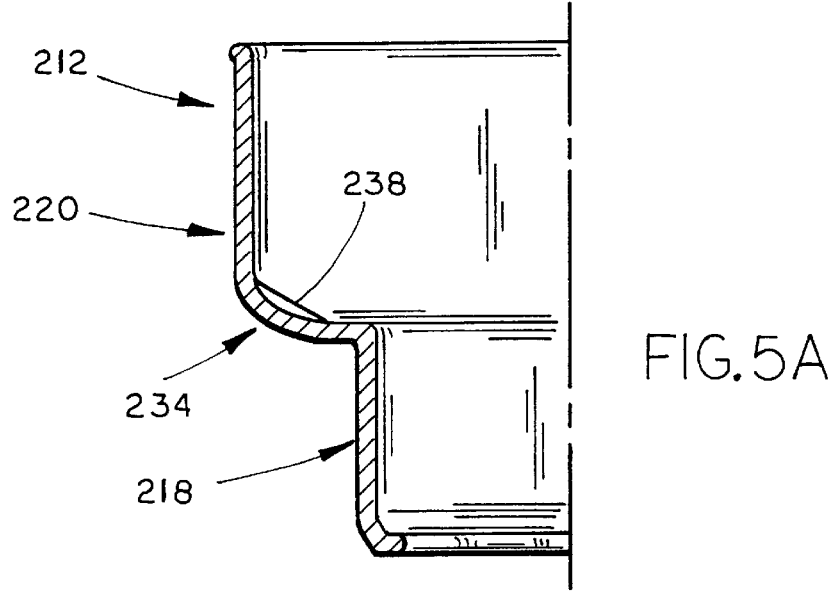
FIG. 5A is a cross-section similar to FIG. 3A of a third embodiment of the adapter of the present invention.

Referring to FIG. 5A, a third embodiment 212 of the adapter of the present invention is illustrated. Adapter 212 includes a lower body portion 218 and upper body portion 220 similar to the first embodiment. Upper body portion 220 and lower body portion 218 are connected by transition portion 234 to provide a support surface 238 for a container or an insert to be held in adapter 212. In the illustrated embodiment, support surface 238 comprises an angled support surface 238 to provide at least limited lateral support to containers that have a smaller diameter than the inside diameter of cylindrical wall 220.

Figure 5B:
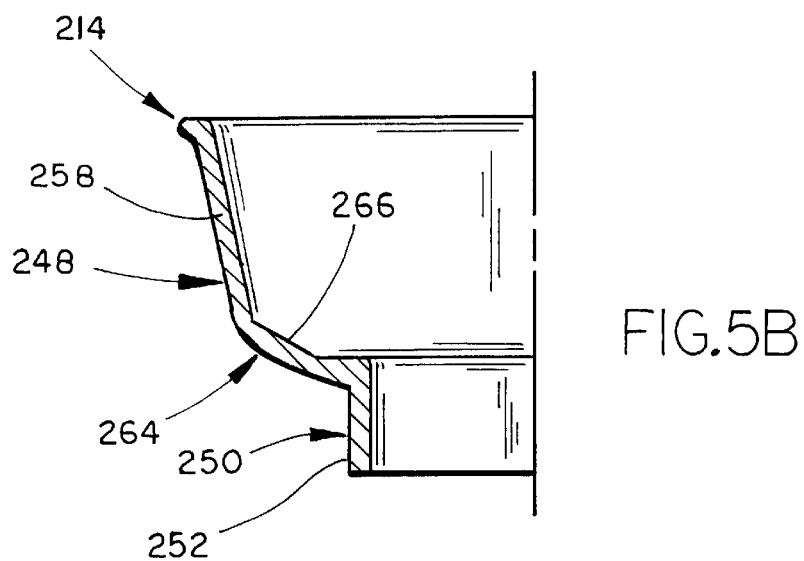
FIG. 5B is a cross-section view similar to FIG. 3B of another embodiment of the insert of the present invention.

Referring to FIG. 5B, a second embodiment 214 of the insert of the present invention is illustrated. Insert 214 includes an upper portion 248 and a lower portion 250 for inserting into either adapter 12, 112, or 212. Insert 214 further includes a transition portion 264 which connects the cylindrical respective cylindrical wall 258 of upper portion 248 and cylindrical wall 252 of lower portion 250 to thereby provide a support surface 266 for a container, as previously described. In the illustrated embodiment, support surface 266 comprises an angled support surface, similar to support surface 238 of adapter 212.

It should be understood from the foregoing that a number of different combinations can be achieved with any one of the adapters and/or inserts to accommodate a conventional cup holder cavity so that the cup holder cavity is adapted to support a larger or smaller container. Furthermore, the adapter assembly of the present invention provides for an optional insert which can be used to further adapt the adapter and, optionally, at least partially insulate the container so that the temperature of the drink in the container remains substantially constant. In addition, insert 14 may be removed from the adapter to provide a jacket around the container to provide insulation for the holder of the container as well.

While several forms of the invention have been shown and described, further modifications would be understood by those skilled in the art. For example, the adapter may include more than two transition portions to provide a plurality of rests or seats for containers and/or inserts. The embodiments described and shown are exemplary only and are not intended to limit the scope of the invention which is defined by the claims which follow.

What is claimed is:

1. A cup holder adapter for a cup holder, the cup holder having a cylindrical cavity having a cavity width, said adapter comprising:

an adapter body having a transverse passage extending through said adapter body for receiving a container, said body including an upper cylindrical wall defining an upper body portion and a lower cylindrical wall defining a lower body portion, said lower body portion having a smaller width than said upper body portion and for inserting into the cylindrical cavity of the cup holder, said transverse passage defining an upper opening at an upper end of said upper body portion and a lower opening at a lower end of said lower body portion, said body further including a transition portion between said upper body portion and said lower body portion, said transition portion defining a rest for the container and thereby adapting the cylindrical cavity to hold the container; and an insert having an upper portion and a lower portion, said lower portion extending into said lower body portion of said adapter body, said upper portion being supported on said rest and for supporting the container in said upper body portion of said adapter body.

2. The cup holder adapter according to claim 1, wherein said rest comprises an annular support surface.

3. The cup holder adapter according to claim 1, wherein said upper body portion includes at least one elongate slot for receiving a handle of a container.

4. The cup holder adapter according to claim 3, wherein said elongate slot extends to said transition portion.

5. The cup holder adapter according to claim 1, wherein said insert comprising a cylindrical body having an upper cylindrical body portion defining said upper portion and a lower cylindrical body portion defining said lower portion, said cylindrical body further having a transition portion between said upper cylindrical body portion and said lower cylindrical body portion, said transition portion of said insert defining a seat for the container, said seat for supporting the container on said rest of said adapter body whereby said insert and said adapter body adapt the cylindrical cavity to hold the container.

6. The cup holder adapter according to claim 5, wherein said transition portion of said insert comprises an annular support surface.

7. The cup holder adapter according to claim 5, wherein said adapter body includes an elongate slot for receiving a handle of a container.

8. A cup holder adapter for a cup holder, the cup holder having a cylindrical cavity having a cavity width, said adapter comprising:

an adapter body having a transverse passage for receiving a container, said body including an upper body portion and a lower body portion, said lower body portion having a smaller width than said upper body portion and for inserting into the cylindrical cavity of the cup holder, said body further including a transition portion between said upper body portion and said lower body portion, said transition portion defining a rest for the container and thereby adapting the cylindrical cavity to hold the container;

an insert having an upper portion and a lower portion, said lower portion extending into said lower body portion of said adapter body, said upper portion being supported on said rest and for supporting the container in said upper body portion of said adapter body, said insert comprising a cylindrical body having an upper cylindrical body portion defining said upper portion and a lower cylindrical body portion defining said lower portion, said cylindrical body further having a transition portion between said upper cylindrical body portion and said lower cylindrical body portion, said transition portion of said insert defining a seat for the container, said seat for supporting the container on said rest of said adapter body whereby said insert and said adapter body adapt the cylindrical cavity to hold the container, said insert including at least one elongate slot, said elongate slot of said insert aligning with an elongate slot of said adapter body for receiving a handle of a container.

9. The cup holder adapter according to claim 8, wherein said at least one of said adapter body and said insert includes reinforcement for a respective elongate slot.

10. The cup holder adapter according to claim 9, wherein said respective elongate slot includes a reinforcing rib extending along a perimeter of said respective elongate slot.

11. A cup holder adapter assembly for a cup holder, the cup holder having a cylindrical cavity having a cavity width, said adapter assembly comprising:

a first body having a transverse passage defining opposed open ends, at least a portion of said first body being adapted to insert into said cavity;

an insert positionable in said transverse passage, said insert including a second body having an upper body portion and a lower body portion, said lower body portion having a smaller width than said upper body portion and for inserting into the transverse passage, said second body including a seat for supporting a container having a width greater than the cavity width and lower body portion for holding a container having a width less than the cavity width thereby adapting the cylindrical cavity to hold a container.

12. The cup holder adapter assembly according to claim 11, wherein said first body includes an upper portion and a lower portion, said lower portion having a smaller width than the cavity width and for inserting into the cylindrical cavity of the cup holder, said lower portion being adapted to frictionally engage the cup holder.

13. The cup holder adapter assembly according to claim 12, wherein said first body includes a rest for supporting said insert in said transverse passage.

14. The cup holder adapter assembly according to claim 12, wherein said insert comprises a paper insert for forming an insulation layer around the container.

15. The cup holder adapter assembly according to claim 12, wherein said insert comprises a foam insert for forming an insulation layer around the container.

16. The cup holder adapter assembly according to claim 12, wherein said first body comprises a plastic body.

17. The cup holder adapter assembly according to claim 12, wherein said first body includes one of tapered sides or generally parallel sides.

18. The cup holder adapter assembly according to claim 12, wherein said first body comprises a cylindrical wall.

19. The cup holder adapter assembly according to claim 12, wherein said insert includes tapered sides to accommodate a range of container sizes.

20. The cup holder adapter assembly according to claim 19, wherein said insert includes a frusto-conical shaped wall.

* * * * *